US012384195B2

(12) United States Patent
Yamada

(10) Patent No.: US 12,384,195 B2
(45) Date of Patent: Aug. 12, 2025

(54) CAN

(71) Applicant: TOYO SEIKAN CO., LTD., Tokyo (JP)

(72) Inventor: Shinji Yamada, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 53 days.

(21) Appl. No.: 18/082,251

(22) Filed: Dec. 15, 2022

(65) Prior Publication Data

US 2023/0122700 A1 Apr. 20, 2023

Related U.S. Application Data

(63) Continuation of application No. PCT/JP2021/021675, filed on Jun. 8, 2021.

(30) Foreign Application Priority Data

Jul. 17, 2020 (JP) ................................ 2020-123320

(51) Int. Cl.
*B44C 3/08* (2006.01)
*B21D 51/26* (2006.01)

(52) U.S. Cl.
CPC .............. *B44C 3/085* (2013.01); *B21D 51/26* (2013.01)

(58) Field of Classification Search
CPC ........... B44C 3/085; B44C 1/24; B21D 51/26; B21D 51/2607; B65D 1/40; B65D 2203/00; B65D 1/165; B65D 1/16
(Continued)

(56) References Cited

U.S. PATENT DOCUMENTS

2008/0069665 A1* 3/2008 Hanafusa ........... B21D 51/2615 413/1
2013/0032604 A1* 2/2013 Jamali ...................... B65D 1/40 220/674
(Continued)

FOREIGN PATENT DOCUMENTS

CN 103803145 A 5/2014
JP 2002-282977 A 10/2002
(Continued)

OTHER PUBLICATIONS

English Machine Translation of JP-2008007202-A (Year: 2008).*
(Continued)

*Primary Examiner* — Don M Anderson
*Assistant Examiner* — Laura E. Parker
(74) *Attorney, Agent, or Firm* — Sughrue Mion, PLLC

(57) ABSTRACT

Provided is a can with a shoulder portion decorated in a novel way. A can includes: a trunk portion; a mouth portion smaller in diameter than the trunk portion; and a shoulder portion provided between the trunk portion and the mouth portion, gradually decreasing in diameter from the side of the trunk portion toward the side of the mouth portion, and having a printed layer and a coating film respectively formed by printing and coating. The shoulder portion includes: a straight portion having an inclined cross-sectional shape along a can axis C; a lower curved portion that is a curved portion connecting the straight portion and the trunk portion; an upper curved portion that is a curved portion connecting the straight portion and the mouth portion; and an embossed portion provided only in the straight portion among the straight portion, the lower curved portion, and the upper curved portion.

14 Claims, 10 Drawing Sheets

(58) Field of Classification Search
USPC .................................................. 220/674, 906
See application file for complete search history.

(56) References Cited

U.S. PATENT DOCUMENTS

| | | | | |
|---|---|---|---|---|
| 2015/0360279 | A1* | 12/2015 | Jentzsch ............ | B21D 51/2638 72/476 |
| 2020/0215597 | A1* | 7/2020 | Manita ..................... | B65D 1/40 |
| 2021/0308736 | A1 | 10/2021 | Manita et al. | |
| 2021/0308737 | A1 | 10/2021 | Manita et al. | |

FOREIGN PATENT DOCUMENTS

| | | | | |
|---|---|---|---|---|
| JP | 2003-340539 | A | | 12/2003 |
| JP | 2004-123231 | A | | 4/2004 |
| JP | 2004-168346 | A | | 6/2004 |
| JP | 2008-7202 | A | | 1/2008 |
| JP | 2008007202 | A | * | 1/2008 |
| JP | 2019-202810 | A | | 11/2019 |
| JP | 2020-78828 | A | | 5/2020 |

OTHER PUBLICATIONS

International Search Report dated Aug. 24, 2021 in International Application No. PCT/JP2021/021675.
International Preliminary Report on Patentability with a translation of the Written Opinion of the International Searching Authority dated Jan. 17, 2023 in International Application No. PCT/JP2021/021675.
Communication dated Jul. 26, 2024 issued by the European Patent Office in application No. 21842568.4.

* cited by examiner

FIG. 4B MEASUREMENT VALUE DATA

| PROTRUDING AMOUNT h20 (mm) | | 0.10 | 0.13 | 0.16 | 0.19 | 0.30 |
|---|---|---|---|---|---|---|
| CURVATURE RADIUS R21 (mm) OF RIDGE CURVED SURFACE 21 | PROTOTYPE 1 | 4.0 | 2.0 | 1.5 | 1.0 | 1.1 |
| | PROTOTYPE 2 | 2.7 | 3.6 | 2.7 | 2.7 | 0.9 |
| | AVERAGE | 3.3 | 2.8 | 2.1 | 1.8 | 1.0 |
| CURVATURE RADIUS R22 (mm) OF RIDGE CURVED SURFACE 22 | PROTOTYPE 1 | 3.9 | 1.3 | 0.7 | 0.7 | 0.5 |
| | PROTOTYPE 2 | 0.7 | 1.1 | 0.9 | 0.8 | 0.3 |
| | AVERAGE | 2.3 | 1.2 | 0.8 | 0.7 | 0.4 |
| R CENTER-TO-CENTER DISTANCE L1 (mm) | PROTOTYPE 1 | 1.4 | 1.1 | 1.0 | 1.0 | 1.1 |
| | PROTOTYPE 2 | 0.9 | 1.2 | 1.1 | 1.2 | 0.8 |
| | AVERAGE | 1.2 | 1.1 | 1.1 | 1.1 | 1.0 |
| INCLINATION ANGLE θ1 (°) | PROTOTYPE 1 | 5.4 | 12.0 | 15.4 | 18.4 | 24.5 |
| | PROTOTYPE 2 | 13.4 | 8.7 | 10.4 | 12.0 | 26.2 |
| | AVERAGE | 9.4 | 10.3 | 12.9 | 15.2 | 25.4 |

CAN

CROSS-REFERENCE TO RELATED APPLICATIONS

This application is a Rule 53(b) Continuation of International Application No. PCT/JP2021/021675 filed Jun. 8, 2021, which claims priority based on Japanese Patent Application No. 2020-123320 filed Jul. 17, 2020, the respective disclosures of which are incorporated herein by reference in their entirety.

TECHNICAL FIELD

The disclosure relates to a can with a decorated shoulder portion.

BACKGROUND

There is a known can having a thick-walled shoulder portion decreasing in diameter from a thin-walled cylindrical trunk portion and a mouth portion, which are sealed by double seaming the mouth portion with a can lid or seaming with a metal cap.

The can trunk portion may be decorated by printing or embossing as disclosed in JP 2003-340539 A. On the other hand, as the decoration of a can shoulder portion, there are cases where printing is performed as in JP 2004-168346 A and where an uneven pattern is formed on the shoulder portion as in JP 2004-123231 A, US 2015/0,360,279 A, and Chinese Patent Application Publication No. 103803145.

In recent years, with the reduction in thickness of cans in line with resource saving, in a case where an uneven pattern is formed on the shoulder portion of a thinned can, if a shoulder portion formation die such as that of JP 2004-123231 A (reference sign 60 in FIG. 7) or US 2015/0,360,279 A (reference sign 10 in FIG. 1) is pressed against the shoulder portion of the can, the shoulder portion buckles. In addition, also in a case where the uneven pattern is formed by pressing a formation die such as the groove forming tool of JP 2004-123231 A (reference sign 72 in FIG. 8) only from the outside of the can shoulder portion, the shoulder portion of the thinned can is abnormally deformed.

SUMMARY

The disclosure has been made in view of such circumstances, and the purpose of which is to provide a can that is properly embossed against the shoulder portion of the can.

According to one aspect of the disclosure, there is provided a can including: a cylindrical portion; a small-diameter portion having a diameter smaller than a diameter of the cylindrical portion; and a reduced-diameter portion that is provided between the cylindrical portion and the small-diameter portion, gradually decreases in diameter from a side of the cylindrical portion toward a side of the small-diameter portion, and has a film formed on at least one of an inner surface and an outer surface by printing or coating, in which the reduced-diameter portion includes: an inclined portion having an inclined cross-sectional shape extending through a center axis of the can; a first curved portion that is a curved portion connecting the inclined portion and a can trunk portion; a second curved portion that is a curved portion connecting the inclined portion and the small-diameter portion; and an embossed portion provided only in the inclined portion among the inclined portion, the first curved portion, and the second curved portion.

According to the disclosure, by providing an embossed portion on a shoulder portion of a can, it is possible to decorate the shoulder portion in a new way, and it is possible to suppress defects (such as defective seaming of a can lid) caused by providing the embossed portion on the shoulder portion.

BRIEF DESCRIPTION OF DRAWINGS

FIG. 4A and FIG. 4B are a vertical cross-sectional view of the vicinity of one embossed portion and a table showing measurement value data of dimensions of each portion of the embossed portion, according to the first embodiment.

DESCRIPTION OF EMBODIMENTS

Embodiments

Hereinafter, embodiments of the disclosure will be described with reference to the drawings and the like.

First Embodiment

Figure 1B:
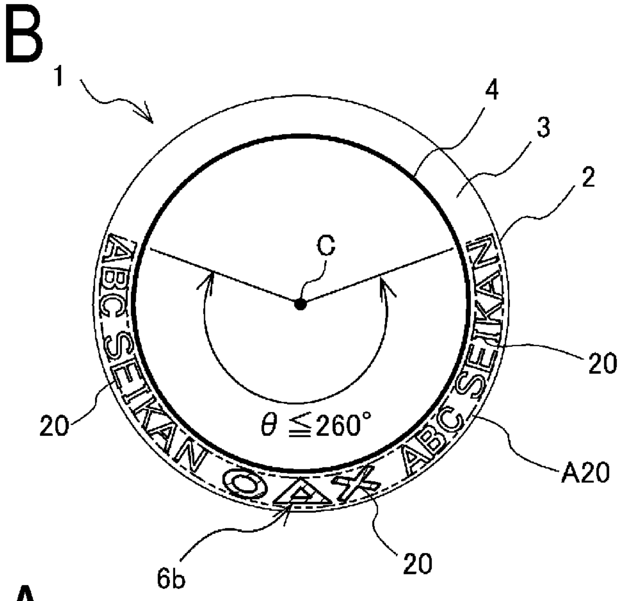
FIGS. 1A to 1C are views illustrating a can according to a first embodiment.
Figure 1A:
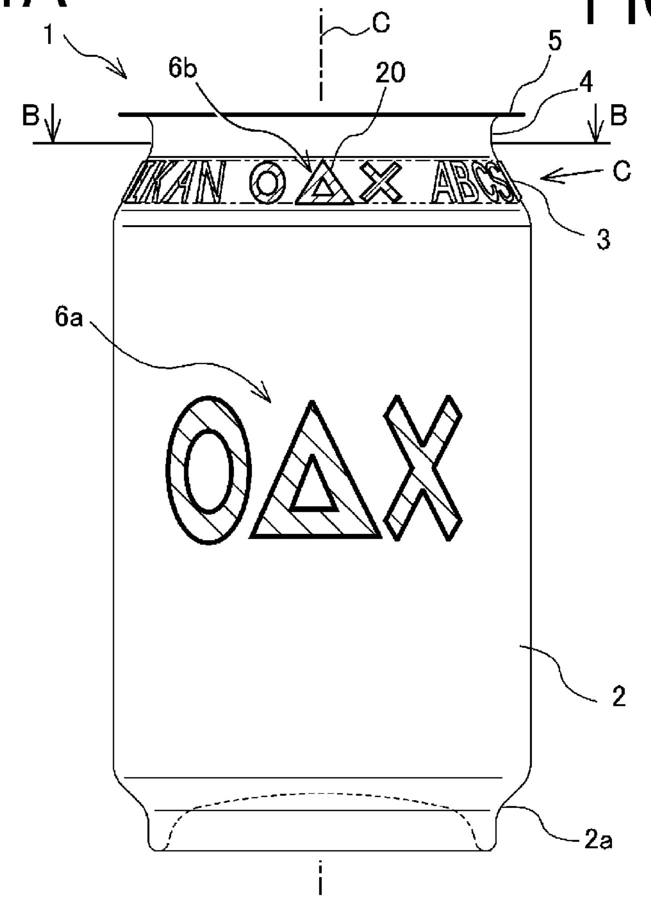
Figure 1C:
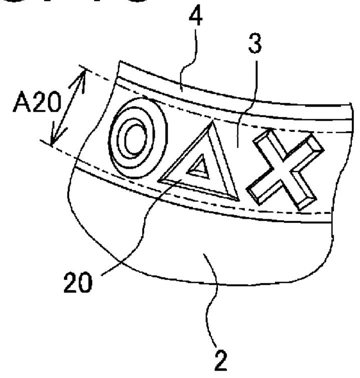

FIGS. 1A to 1C are views illustrating a can 1 according to a first embodiment.

FIG. 1A is a front view of the entirety of the can 1.

FIG. 1B is a cross-sectional view taken along line B-B in FIG. 1A, and is a view illustrating a state in which a shoulder portion 3 is viewed from above.

FIG. 1C is a perspective view of the vicinity of a part of an embossed portion 20 (a portion where "○×Δ" are formed).

Figure 2:
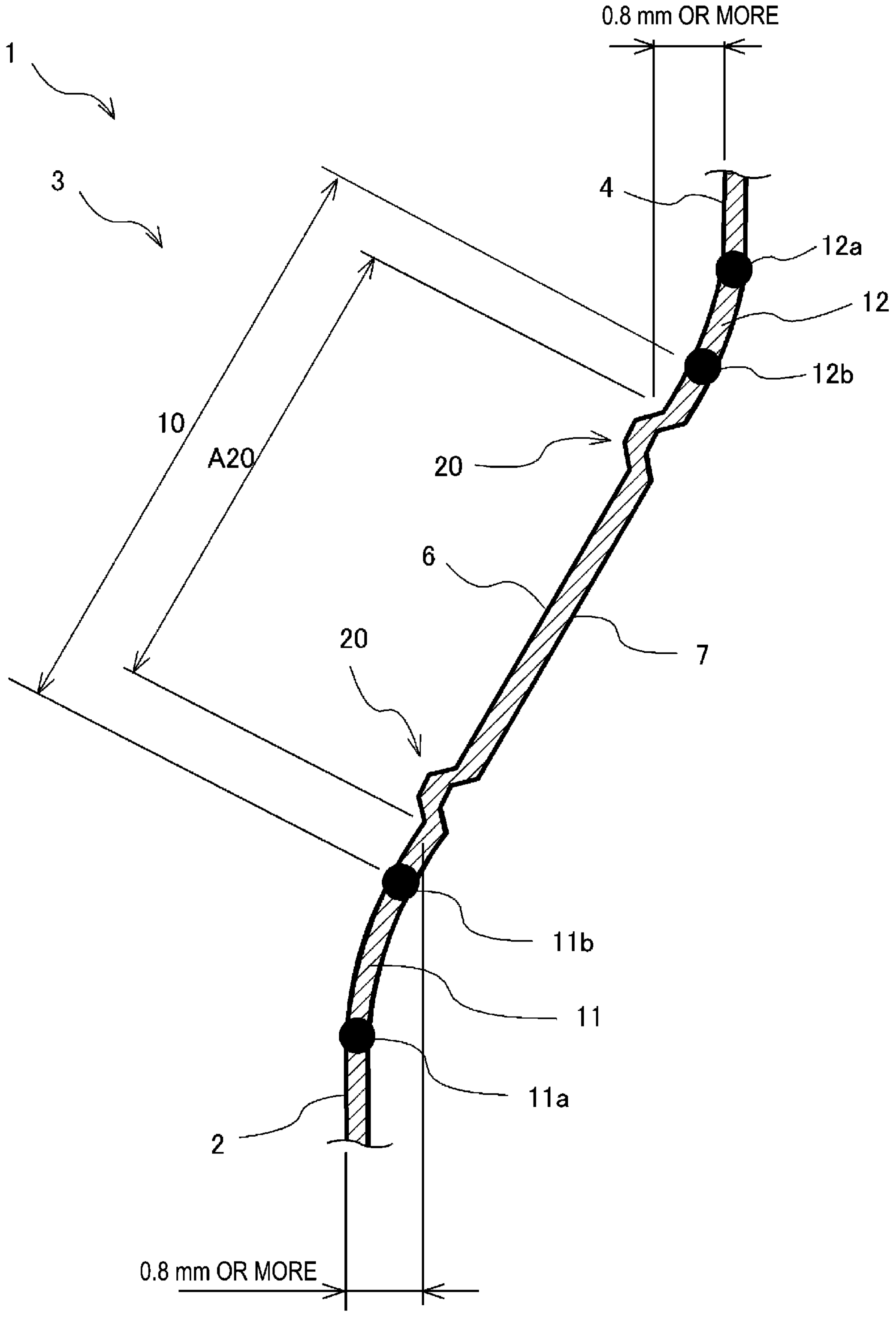
FIG. 2 is an enlarged vertical cross-sectional view of the vicinity of a shoulder portion of the can according to the first embodiment (a view taken along a cutting plane extending through a can axis C).

FIG. 2 is an enlarged vertical cross-sectional view of the vicinity of the shoulder portion 3 of the can 1 according to the first embodiment (a view taken along a cutting plane extending through the can axis C).

Figure 3A:
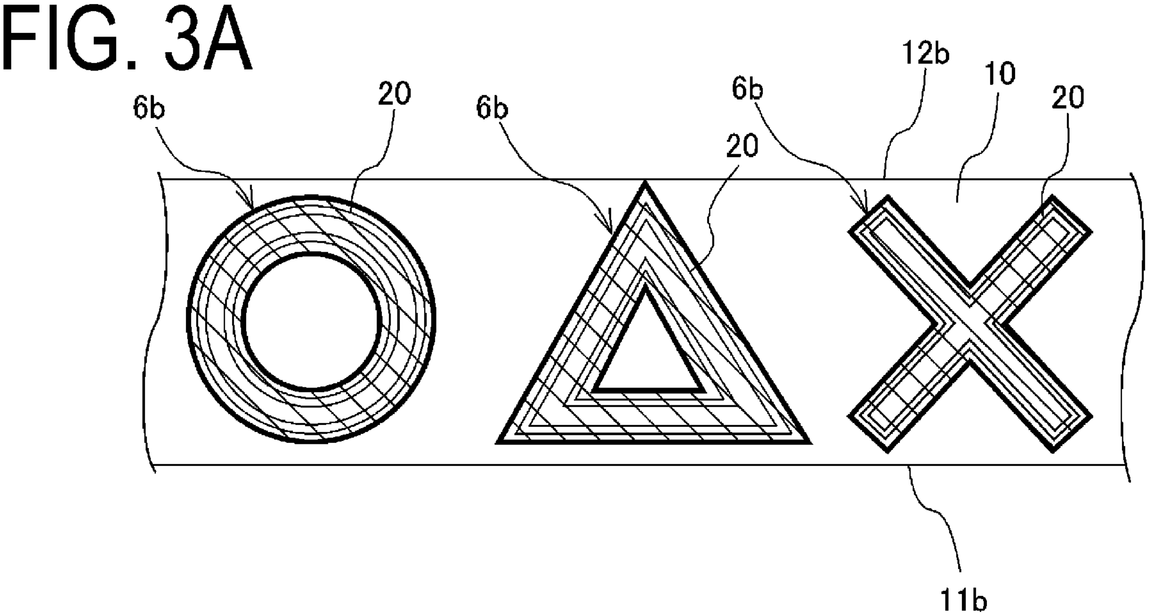
FIG. 3A and FIG. 3B are diagrams illustrating a positional relationship between an embossed portion and a printed portion according to the first embodiment.
Figure 3B:
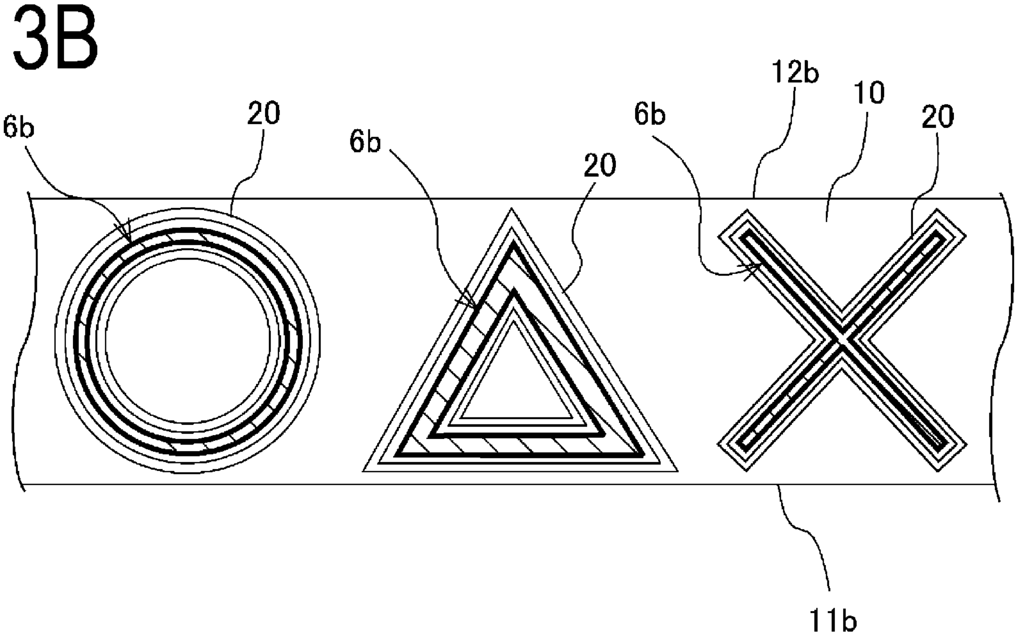

FIG. 3A and FIG. 3B are diagrams illustrating a positional relationship between the embossed portion 20 and a printed portion according to the first embodiment.

FIG. 3A is a view illustrating a part of the embossed portion 20 and a printed portion 6*b* corresponding thereto when viewed from the normal direction of a straight portion 10.

FIG. 3B is a diagram illustrating another aspect of the printed portion.

In the embodiment, the center axis of the can 1 is appropriately referred to as a can axis C, and the can lid side in the axial direction of the can axis C is appropriately referred to as an upper side, and the bottom side is appropriately referred to as a lower side.

Configuration of Can 1

The can 1 is formed of a known metal material used for a can, such as steel, tin, aluminum, or an aluminum alloy.

As illustrated in FIGS. 1A to 1C, and FIG. 2, the can 1 includes a trunk portion 2 (cylindrical portion), the shoulder portion 3 (reduced-diameter portion), and a mouth portion 4 (small-diameter portion).

A printed layer 6 (film) is provided on the outer surface of the can 1 by, for example, gravure printing, offset printing, flexographic printing, inkjet printing, or the like, and a coating film 7 (film) is provided on the back surface of the can 1 by coating or the like. Such a film may be formed by thermally bonding a film such as a polyester film to the surface. Further, the printed layer 6 may be provided on such a film after the film is thermally bonded to the can 1.

As illustrated in FIG. 1B, a front printed portion 6*a* which is printed with a trade name "○×Δ" or the like is provided at the center of the front surface of the outer surface of the trunk portion 2 and at a portion which becomes the front surface when displayed.

The trunk portion 2 has a cylindrical shape. The outer diameter of the trunk portion 2 is usually φ53 mm, φ66 mm or the like. The lower end of the trunk portion 2 is provided with a chime portion 2*a* whose diameter gradually decreases toward the lower side.

The shoulder portion 3 is connected to the upper side of the trunk portion 2 and is a portion whose diameter gradually decreases toward the upper side (mouth portion 4 side). In other words, the diameter of the shoulder portion 3 decreases from the trunk portion 2 side to the mouth portion 4 side. The maximum outer diameter of the shoulder portion 3 (i.e., the outer diameter of the connecting portion between the shoulder portion 3 and the trunk portion 2, which is the same as the outer diameter of the trunk portion 2 when the side surface of the trunk portion 2 is straight) may be, for example, from 50 to 70 mm.

The wall thickness of the shoulder portion is preferably as thin as 0.1 to 0.3 mm, and more preferably 0.1 to 0.2 mm. By setting the wall thickness of the shoulder portion in this manner, the material of the can 1 can be reduced.

However, since the shoulder portion 3 is subjected to diameter reduction processing, the wall thickness of the shoulder portion 3 may be thicker than the wall thickness of the trunk portion 2 and the like. In this case, since the shoulder portion 3 has a sufficient strength, it is possible to suppress formation of a fine hole such as a pinhole at the time of processing, and to suppress buckling or the like caused by an external force.

The mouth portion 4 is connected to the upper end side of the shoulder portion 3 and extends upward. A tip of the mouth portion 4 is provided with a flange 5. A known can lid (not illustrated) is wound around the mouth portion 4. The inside diameter of the mouth portion 4 is smaller than the diameter of the trunk portion 2, and can be, for example, from 25 to 60 mm.

The ratio of the shoulder portion maximum outer diameter to the inner diameter of the mouth portion 4 is preferably, for example, from 1.05 to 1.58. By setting such a ratio, the width of the shoulder portion 3 having an installation range A20 of the embossed portion 20 can be sufficiently wide.

Configuration of Shoulder Portion 3

As illustrated in FIG. 2, the shoulder portion 3 includes the straight portion 10 (inclined portion), a lower curved portion 11 (first curved portion), an upper curved portion 12 (second curved portion), and the embossed portion 20.

In FIG. 2, both end portions of the lower curved portion 11 (a contact point 11*a* between the lower curved portion 11 and the trunk portion 2 and a contact point 11*b* between the lower curved portion 11 and the straight portion 10 of the shoulder portion 3) and both end portions of the upper curved portion 12 (a contact point 12*b* between the upper curved portion 12 and the straight portion 10 and a contact point 12*a* between the upper curved portion 12 and the mouth portion 4) are indicated by black circles. Although the thickness of the shoulder portion 3 gradually increases from the lower curved portion 11 to the straight portion 10 and then to the upper curved portion 12, each figure shows the thickness equally for simplicity.

The straight portion 10 is a portion having a straight cross-sectional shape.

The straight portion 10 is a portion inclined in a shape of a truncated cone side surface in a middle region of the shoulder portion 3. The inclination angle of the straight portion 10 with respect to the can axis C is preferably set to from 10 to 50° (more preferably from 25 to 45°). This is because the steeper the inclination of the shoulder portion 3 (closer to vertical), the wider the shoulder portion 3, and thus the region of the straight portion 10, which is the installation range A20 of the embossed portion 20, can be made larger.

The lower curved portion 11 is a curved portion connecting the straight portion 10 and the trunk portion 2.

The upper curved portion 12 is a curved portion connecting the straight portion 10 and the mouth portion 4.

In the embodiment, an example in which the lower curved portion 11 is an arc connecting the straight portion 10 and the trunk portion 2 in a tangential line shape in a cross-sectional view is described, but the lower curved portion 11 is not limited thereto. For example, the lower curved portion 11 may be connected at a vertex having a sufficiently large angle (approximately 180°) instead of the tangential line shape, or may be a curved portion having an elliptical shape or the like. The same applies to the upper curved portion 12.

Among the straight portion 10, the lower curved portion 11, and the upper curved portion 12, the embossed portion 20 is provided only in the straight portion 10. The shape of the embossed portion 20 is an outward protruding shape as illustrated in FIG. 1C and the like, but may be an inward protruding shape.

The shape of the embossed portion 20 (the shape when the straight portion 10 is viewed from the normal direction) is a shape of the character string of the trade name "○×Δ" or "ABCSEIKAN". Therefore, for example, the shape of the embossed portion 20 has a linear portion, a portion having a complicated shape (a curved portion, an intersecting portion, a portion forming a corner, or the like). Further, the cross-sectional shape of the shoulder portion 3, which is orthogonal to the can axis C and includes the embossed portion 20, has a shape in which the unevenness changes irregularly.

The shape of the embossed portion is not limited thereto, and various shapes can be employed. For example, the embossed portion may be designed to have a geometric pattern, a symbol, a person, an animal, a plant, a vehicle, an instrument, a landscape, food or drink, packaged food or drink, or the like. As will be described later, the three dimensional shape of the embossed portion may be a truncated cone shape or the like.

On the outer surface of the shoulder portion 3, the installation range A20 of the embossed portion 20 is separated from the contact point 11*a* of the lower curved portion 11 and the trunk portion 2 by 0.8 mm or more in the inner radial direction, and separated from the contact point 12*a* of the upper curved portion 12 and the mouth portion 4 by 0.8 mm or more in the outer radial direction.

As described above, the embossed portion 20 is disposed at a position sufficiently away from the lower curved portion 11. Thus, when an external force is applied to the can 1, the vicinity of the lower curved portion 11 can be prevented from becoming a starting point of buckling.

Further, the embossed portion 20 is disposed at a position sufficiently away from the upper curved portion 12. Thus, it is possible to suppress shape defects and the like of the flange 5 caused by forming the embossed portion 20. As a result, defective seaming of the can lid is suppressed.

Furthermore, by providing the embossed portion 20 in the straight portion 10, the embossed portion 20 does not come into contact with other members during handling (during transportation, storage, display in a store, or the like), and the print in the vicinity of the embossed portion 20 does not peel off.

These functions and effects can be sufficiently expected if the embossed portion 20 is disposed only in the straight portion 10 and is installed without overlapping the lower curved portion 11 and the upper curved portion 12.

As illustrated in FIG. 1B, when the can 1 is viewed from the upper side, the installation range A20 of the embossed portion 20 is a portion corresponding to an arc having a center angle θ of $0° < \theta \leq 260°$ in the shoulder portion 3. That is, the embossed portion 20 is provided on an arc having a center angle θ of 260° or less (the upper limit value of the center angle θ of the arc is 260°). The reason why the installation range A20 is limited in this manner is that the installation range A20 is a range corresponding to a length of an outer peripheral surface of a receiving portion 62 of an inner roll 60, as described later.

It is preferable that a center portion of the installation range A20 faces the front direction of the can 1. In this case, the can 1 is displayed facing the front, whereby the center of the installation range A20 faces the front. Thus, when the can 1 is displayed, the embossed portion 20 has good visibility and exhibits high appeal.

Although not illustrated in the drawings, a plurality of the cans 1 are displayed in the front-rear direction in a store or the like. Since the embossed portion 20 is provided on the inclined straight portion 10, the embossed portion 20 of the can 1 arranged at the rear side can be visually recognized when observed from the front and obliquely upward. Thus, the can 1 can improve the appeal.

As indicated by hatching in FIG. 3A, the straight portion 10 includes the printed portion 6*b*. The printed portion 6*b* is a print of a character string corresponding to the shape of the embossed portion 20, such as the trade name "○×Δ" or "ABCSEIKAN", and is disposed surrounding the embossed portion 20.

In FIG. 3A, only a portion of the printed portion 6*b* corresponding to the trade name "○×Δ" is illustrated, but portions such as "ABCSEIKAN" are also printed in the same manner.

The outer shape of the printed portion 6*b* and the outer shape of the embossed portion 20 are designed to be separated from each other by, for example, 1 mm or more. As a result, even if there is a printing shift at the time of printing or a processing shift at the time of processing the embossed portion 20, this shift can be made inconspicuous.

As illustrated in FIG. 3B, the printed portion 6*b* may be disposed inside each embossed portion 20.

The embossed portion 20 may be disposed on the side of the drinking hole of the can lid in the straight portion 10. In this case, when a purchaser or the like of the can 1 drinks the beverage, the purchaser or the like naturally sees the embossed portion 20, thus improving the appeal. On the other hand, the embossed portion 20 may be disposed at a position on the straight portion 10 other than the drinking opening side of the can lid. In this case, the beverage dripping onto the straight portion 10 is less likely to accumulate in the straight portion 10.

Detailed Shape of Embossed Portion 20

Figure 4A:
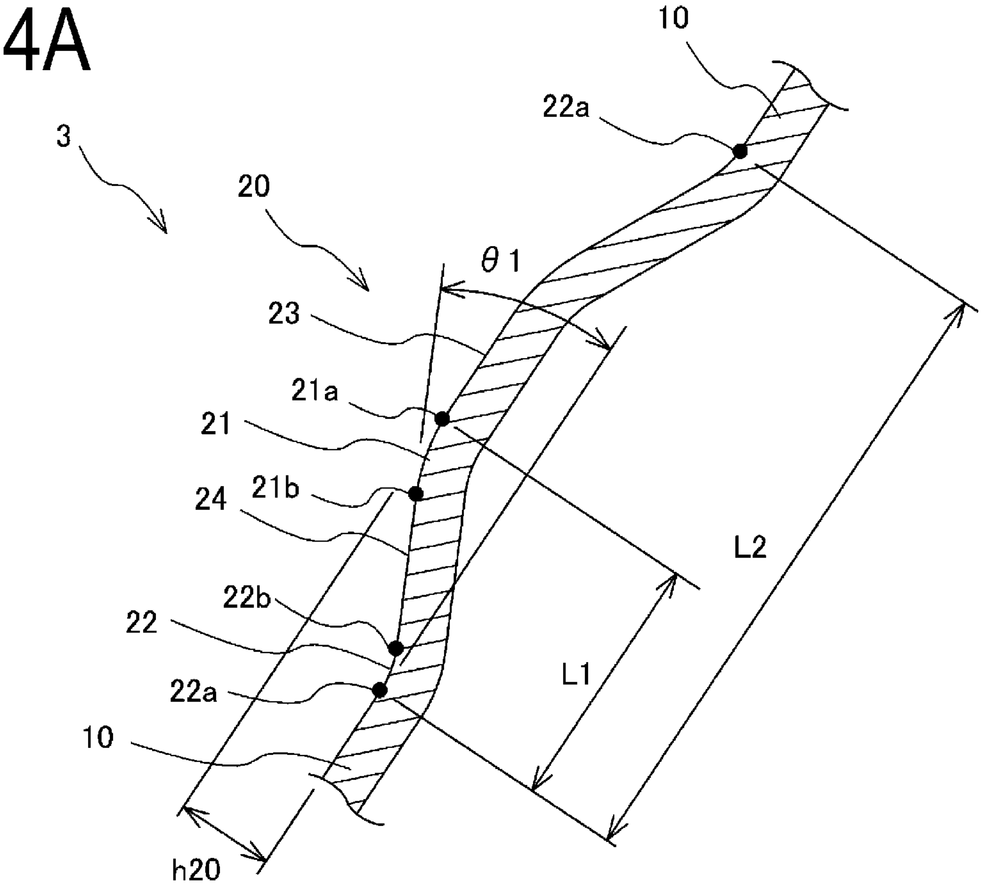

FIG. 4A and FIG. 4B are a vertical cross-sectional view of the vicinity of one embossed portion 20, and a table showing measurement value data of dimensions of each portion of the embossed portion 20, according to the first embodiment.

The table in FIG. 4B shows actual measurement values of dimensions of each portion of the can 1 in the case where the visibility of the embossed portion 20 is acceptable and there is no exposure of the metallic base of the can 1 due to cracking of the printed portion 6*b* and the coating film 7, under the conditions that the thickness of the shoulder portion 3 is from 0.16 to 0.17 mm and protruding amounts h20 of the embossed portion 20 are 0.10, 0.13, 0.16, 0.19, and 0.30 mm.

The measurement values in FIG. 4B were obtained by actually making a prototype of the can 1 and evaluating the prototype.

In FIG. 4A and FIG. 4B, the portions and their dimensions are as follows.

Protruding amount h20: a protrusion height of the embossed portion 20, which is a length between the outer surface of the straight portion 10 and the top surface 23 of the embossed portion 20 in the normal direction of the straight portion 10.

Ridge curved surface 21, curvature radius R21: the ridge curved surface 21 is a curved surface connecting the top surface 23 of the embossed portion 20 and the side surface 24 of the embossed portion 20. In the cross-sectional view, the ridge curved surface 21 is an arc connecting the top surface 23 and the side surface 24 in a tangential line shape. In FIG. 4A, a contact point 21*a* between the ridge curved surface 21 and the top surface 23 and a contact point 21*b* between the ridge curved surface 21 and the side surface 24 are indicated by black circles. The curvature radius R21 is a curvature radius of the ridge curved surface 21.

Root curved surface 22, curvature radius R22: a curved surface connecting the side surface 24 of the embossed portion 20 and the outer surface of the straight portion 10. In the cross-sectional view, the root curved surface 22 is an arc connecting the straight portion 10 and the side surface 24 in a tangential line shape. In FIG. 4A, a contact point 22*a* between the root curved surface 22 and the straight portion 10 and a contact point 22*b* between the root curved surface 22 and the side surface 24 are indicated by black circles. The curvature radius R22 is a curvature radius of the root curved surface 22.

The ridge curved surface 21 may be connected to the top surface 23 and the side surface 24 at a vertex having a sufficiently large angle (approximately 180°) instead of the tangential line shape, or may be a curved portion having an elliptical shape or the like. The same applies to the root curved surface 22.

R center-to-center distance L1 (mm): a distance along the straight portion 10 between the contact point 21*a* and the contact point 22*a*. In the embodiment, the ridge curved surface 21 and the root curved surface 22 are tangential line shapes. Therefore, the R center-to-center distance L1 is a distance along the straight portion 10 between the center of the arc of the ridge curved surface 21 and the center of the arc of the root curved surface 22.

Inclination angle θ1 (°): an inclination angle of the side surface 24 with respect to the straight portion 10.

From the actual measurement value data in the table in FIG. 4B, when the protruding amount h20 of the embossed portion 20 is from 0.10 to 0.30 mm, the dimensions of each portion are in the following ranges.

Curvature radius R21 (mm) of ridge curved surface 21: from 1.0 to 3.3

Curvature radius R22 (mm) of root curved surface 22: from 0.4 to 2.3

R center-to-center distance L1 (mm): from 1.0 to 1.2

Inclination angle θ1 (°): from 9.4 to 25.4

It is empirically known from conventional results that the visibility of the embossed portion 20 and the exposure of the metallic base of the can 1 are not affected even if the R center-to-center distance L1 is increased by about 0.7 mm. In consideration of this, "R center-to-center distance L1 (mm): from 1.0 to 1.9" can be set.

Furthermore, based on the actual measurement value data in the table in FIG. 4B, when an approximate curve of the dimensions of each portion was created with the protruding amount h20 in the range of from 0.12 to 0.20 mm, the following range was obtained.

Curvature radius R21 (mm) of ridge curved surface 21: from 1.6 to 2.9

Curvature radius R22 (mm) of root curved surface 22: from 0.7 to 1.5

R center-to-center distance L1 (mm): from 1.0 to 1.2

Inclination angle θ1 (°): from 10.0 to 16.6

Therefore, within the above range, it can be expected that the visibility of the embossed portion 20 is good and the embossed portion 20 can be processed without exposing the metallic base of the can 1.

In addition, the outer shape L2 of the embossed portion 20 can be 1.1 mm or more. This can be confirmed from the fact that when both a tip of a protruding portion 65 (see FIG. 6A and FIG. 6B) of the inner roll 60 and a protruding portion (see an edge portion of a recessed portion 75 in FIG. 6A and FIG. 6B) of an outer roll 70 are formed as hemispherical surfaces having a radius of 0.2 mm, the smallest value of the measurement values of the outer shape L2 is 1.1 mm. When the tip of the protruding portion 65 was a hemispherical surface having a radius of 0.3 mm, the smallest value of the actual measurement values of the outer shape L2 was 1.5 mm.

Manufacturing Method for Can 1

A manufacturing method for the can 1 will be described.

Figure 5A:
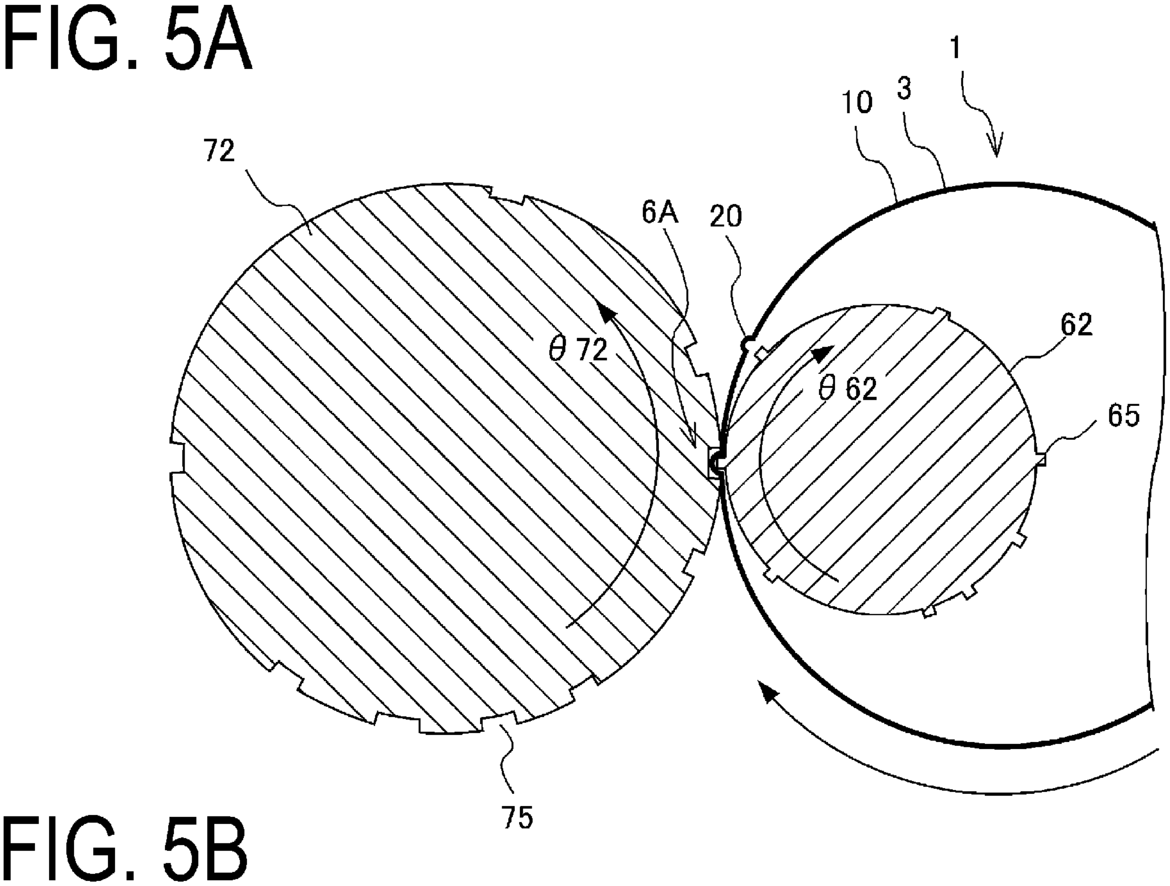
FIG. 5A and FIG. 5B are diagrams illustrating an inner roll and an outer roll at the time of embossing according to the first embodiment.
Figure 5B:
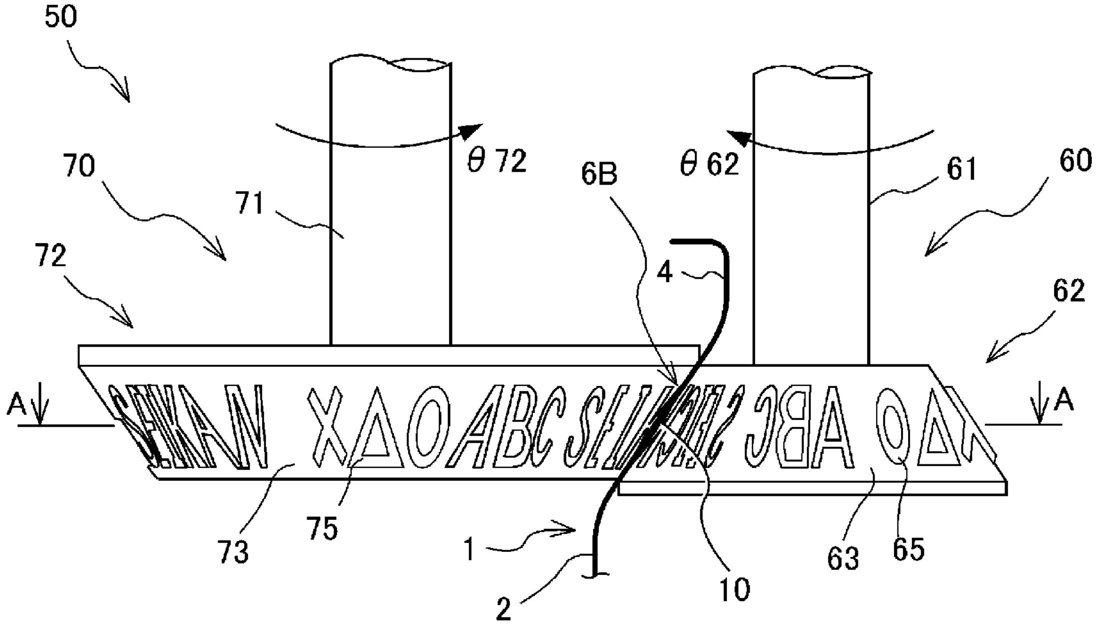

FIG. 5A and FIG. 5B are diagrams illustrating the inner roll 60 and the outer roll 70 at the time of embossing according to the first embodiment.

FIG. 5A is a cross-sectional view taken along line A-A in FIG. 5B, and is a transverse cross-sectional view of the inner roll 60 and the outer roll 70.

FIG. 5B is a view of the inner roll 60 and the outer roll 70 viewed from the outside in the radial direction.

In FIG. 5A and FIG. 5B, only some of a plurality of the protruding portions 65 and recessed portions 75 are illustrated, and the other protruding portions 65 and recessed portions 75 are not illustrated.

Figure 6A:
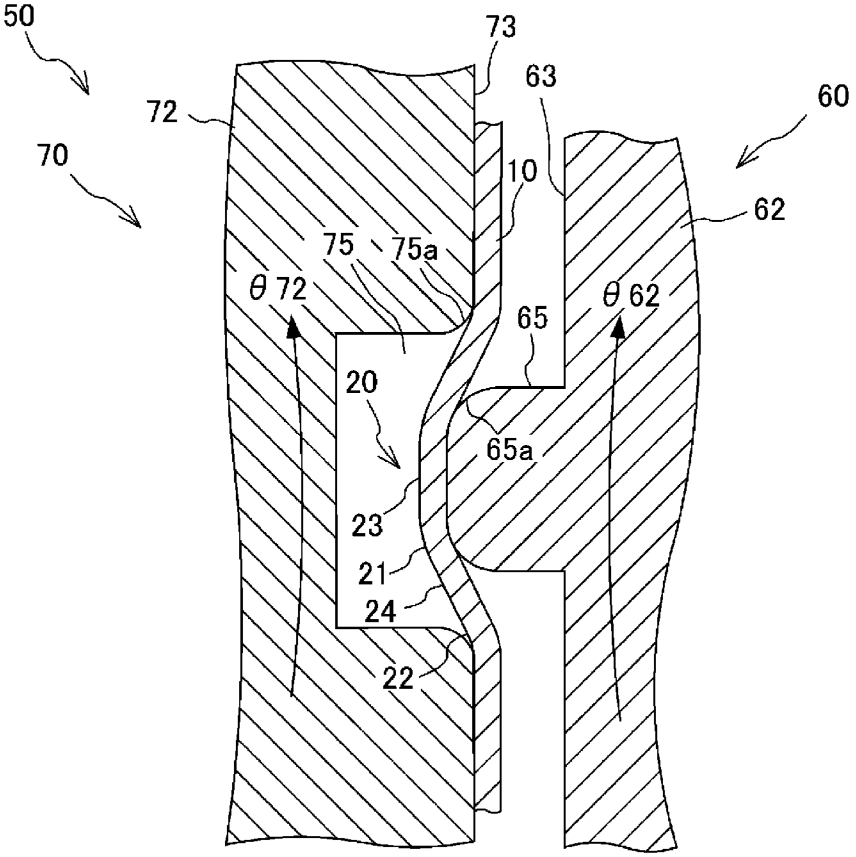
FIG. 6A and FIG. 6B are enlarged views illustrating an aspect at the time of embossing according to the first embodiment.
Figure 6B:
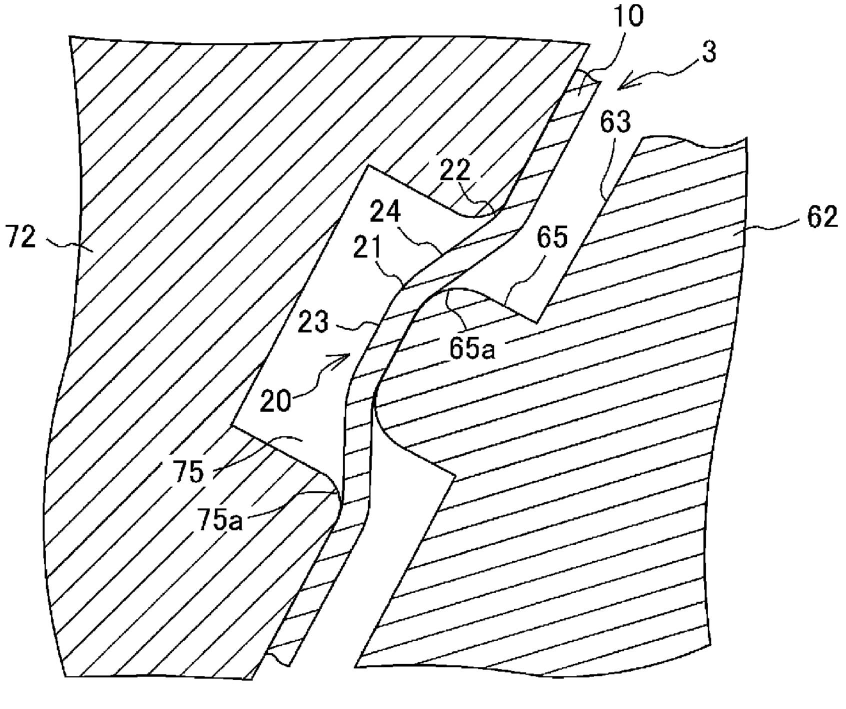

FIG. 6A and FIG. 6B are enlarged views illustrating an aspect at the time of embossing according to the first embodiment.

FIG. 6A is an enlarged view of a portion indicated by an arrow 6A in FIG. 5A.

FIG. 6B is an enlarged view of a portion indicated by an arrow 6B in FIG. 5B.

Figure 7A:
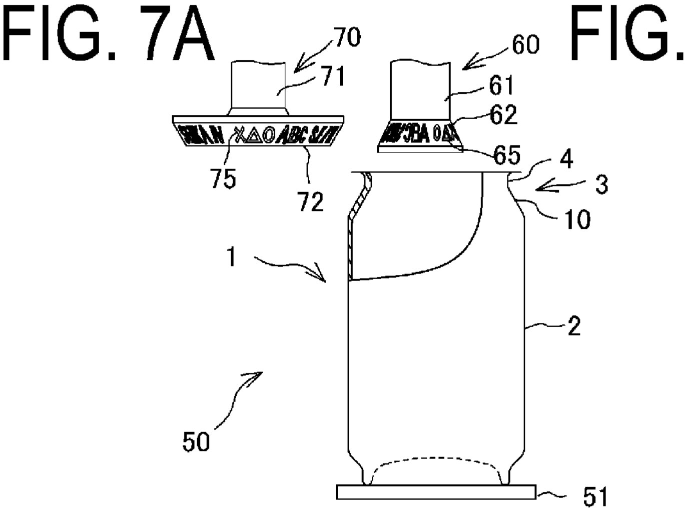
FIGS. 7A to 7E are views illustrating a manufacturing process of the can according to the first embodiment with reference to a schematic view including a partial cross section of the can.
Figure 7D:
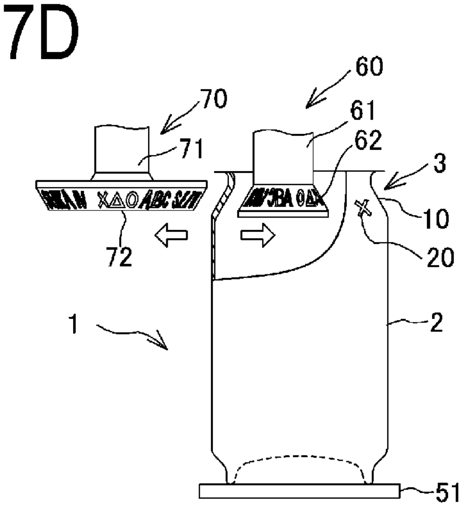
Figure 7B:
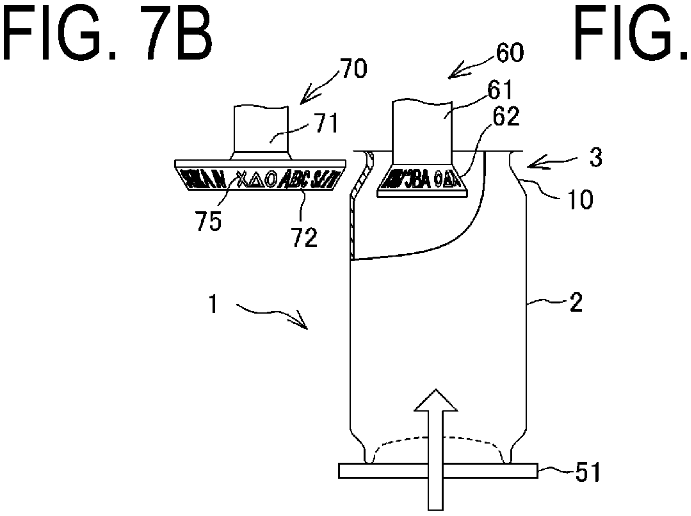

FIGS. 7A to 7B are views illustrating a manufacturing process of the can 1 according to the first embodiment with reference to a schematic view including a partial cross section of the can 1.

In the manufacturing method of the can 1, as a pre-process, a bottomed cylindrical intermediate formed body having the trunk portion 2 is manufactured by known drawing and ironing or the like, and the inner and outer surfaces of the intermediate formed body are subjected to printing, coating or the like as necessary. In the embodiment, the intermediate formed body is also referred to as the can 1.

After that, the intermediate formed body of the can 1 is subjected to known processing such as die necking including a plurality of steps, roll necking (spin flow necking), or a combination of die necking and roll necking including a plurality of steps, thereby forming the shoulder portion 3.

Then, the mouth portion 4 having the flange 5 at an opening end is formed on the intermediate formed body of the can 1 by a known die flanger, spin flanger or the like.

Thus, an intermediate formed body of the can 1 as illustrated in FIGS. 7A to 7D and the like is manufactured.

Next, as illustrated in FIG. 5A and FIG. 5B, FIG. 6A and FIG. 6B, and FIGS. 7A to 7E, a manufacturing apparatus 50 (can manufacturing apparatus) is used to form the embossed portion 20 in the shoulder portion 3.

Manufacturing Apparatus 50

The manufacturing apparatus 50 includes a mounting table 51, the inner roll 60, and the outer roll 70.

As illustrated in FIGS. 7A to 7E, the mounting table 51 is driven by a driving apparatus (not illustrated) including a motor and the like.

The mounting table 51 is rotationally driven together with the can 1 in a state where the can 1 is mounted thereon. The mounting table 51 is driven to move the can 1 to a pre-processing position and a retracted position retracted from the pre-processing position in a state where the can 1 is mounted on the mounting table 51. The rotation axis of the mounting table 51, the rotation axis of the inner roll 60, and the rotation axis of the outer roll 70 are parallel to each other.

As illustrated in FIG. 5A and FIG. 5B, and FIG. 6A and FIG. 6B, the inner roll 60 and outer roll 70 form part of a can making tool set.

The inner roll 60 includes a shaft 61 and the receiving portion 62.

The shaft 61 is rotationally driven by a driving apparatus (not illustrated).

Since the receiving portion 62 is fixed to a lower end of the shaft 61, the receiving portion 62 is rotationally driven integrally with the shaft 61 (see the rotational direction θ62). The receiving portion 62 is a truncated cone member having a diameter increasing from the upper side to the lower side. A truncated cone side surface 63 of the receiving portion 62 has an inclination angle along the straight portion 10 of the can 1.

The maximum outer diameter of the receiving portion 62 is smaller than the inner diameter of the mouth portion 4 of the can 1. Therefore, the inner roll 60 can be inserted into and removed from the mouth portion 4 of the can 1 at the time of processing the embossed portion 20.

The truncated cone side surface 63 is provided with the plurality of protruding portions 65 for forming a plurality of the embossed portions 20.

The protruding portions 65 are provided protruding toward the outside in the radial direction from the truncated cone side surface 63. The entire periphery of the edge portion of the top surface of the protruding portion 65 is a curved surface 65*a*.

Similarly to the inner roll 60, the outer roll 70 includes a shaft 71 and a receiving portion 72, and is rotationally driven by a driving apparatus (not illustrated) (see a rotation direction θ72).

The receiving portion 72 is a truncated cone member having a diameter decreasing from the upper side to the lower side. The receiving portion 72 is larger than the receiving portion 62 of the inner roll 60. An inclination angle of a truncated cone side surface 73 of the receiving portion 72 is equal to the inclination angle of the truncated cone side surface 63 of the receiving portion 62.

The truncated cone side surface 73 is provided with the plurality of recessed portions 75 corresponding to the protruding portions 65 of the receiving portion 62. That is, each protruding portion 65 of the receiving portion 62 and each recessed portion 75 of the receiving portion 72 corresponding thereto are disposed at such positions where they mesh with each other in a case where the receiving portions 62, 72 rotate at the same peripheral speed.

An edge portion 75*a* of an opening of the recessed portion 75 is a curved surface.

In a case where the embossed portion 20 has an inwardly protruding shape, a plurality of recessed portions may be formed in the receiving portion 62 of the inner roll 60 and a plurality of protruding portions may be formed in the receiving portion 72 of the outer roll 70.

According to the above-described configuration, the shape of the receiving portions 62, 72 is an umbrella shape having the truncated cone side surfaces 63, 73 conforming to the shape of the straight portion 10 of the shoulder portion 3. Accordingly, in a state in which the straight portion 10 is sandwiched by the receiving portions 62, 72, these three members are rotationally driven at the same peripheral speed, thereby the receiving portions 62, 72 rotate in a state in which the straight portion 10 is sandwiched in a bevel-gear-like manner.

As illustrated in FIG. 6A and FIG. 6B, and the like, the protruding portion 65 of the receiving portion 62 presses the straight portion 10 of the can 1 from the inside, and the truncated cone side surface 73 of the receiving portion 72 of the outer roll 70 receives the straight portion 10 from the outside.

Therefore, in a region where the protruding portion 65 and the recessed portion 75 are formed, the top surface of the protruding portion 65 pushes the straight portion 10 into the recessed portion 75 while stretching the straight portion 10. As a result, the embossed portion 20 is formed by drawing.

In this case, the ridge curved surface 21 of the embossed portion 20 has a shape following the curved surface 65*a* of the protruding portion 65. Further, the straight portion 10 is pushed into the recessed portion 75 while abutting against the edge portion 75*a* of the recessed portion 75. Therefore, a portion of the straight portion 10 in the vicinity of the edge portion 75*a* is pushed into the recessed portion 75 while being curved. As a result, the root curved surface 22 having a smaller curvature radius than the ridge curved surface 21 is formed.

Note that the edge portion 75*a* of the recessed portion 75 may have a rectangular shape.

As described above, the embossed portion 20 is processed into a protruding shape by stretching a part of the straight portion 10. Accordingly, the printed layer 6 and the coating film 7 (see FIG. 2) provided on the shoulder portion 3 are also stretched together. In this case, when cracks or the like occur in the printed layer 6 and the coating film 7, the metallic base of the can 1 is exposed. In the embodiment, it is possible to suppress such exposure of the metallic base by setting the dimensions of the respective portions of the embossed portion 20 in the above-described range.

The inclination angle of the straight portion 10 of the can 1 of the embodiment is set to be from 10° to 50°. Therefore, the truncated cone side surface 63 of the receiving portion 62 of the inner roll 60 can secure a sufficient area for forming the plurality of embossed portions 20. In addition, the inner roll 60 can be inserted into and removed from the mouth portion 4 even if the shaft 61 has a sufficient thickness or wall thickness for strength. Further, when sandwiching the straight portion 10 from the radial direction, the receiving portions 62, 72 can apply a sufficient pressure to the straight portion 10 from the normal direction of the straight portion 10. Thus, the processability of the embossed portion 20 can be improved.

Manufacturing Process

A series of manufacturing processes for manufacturing the can 1 will be described.

Can Placing Step: FIG. 7A

The can 1 is mounted on the mounting table 51 by a conveying apparatus (not illustrated).

Inner Roll 60 Insertion Step: FIG. 7B

Next, the can 1 is moved to the processing position by moving the mounting table 51.

Thus, the inner roll 60 is inserted into the can 1 from the mouth portion 4.

Figure 7E:
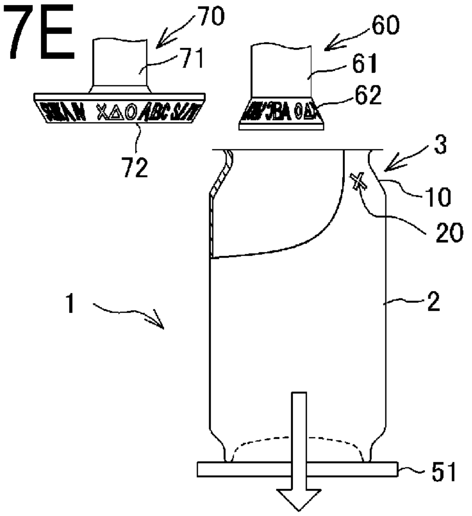
Figure 7C:
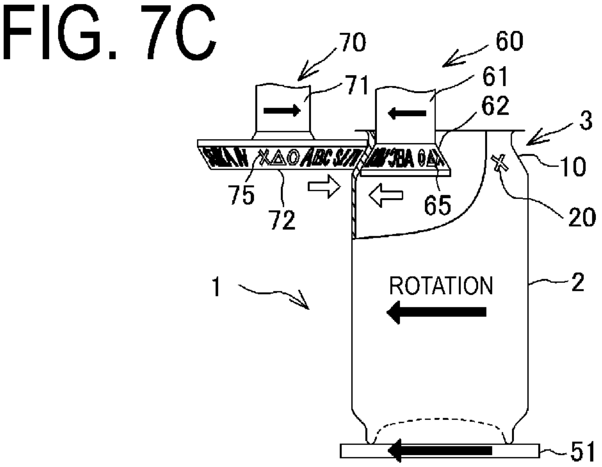

Sandwiching Step of Sandwiching Shoulder Portion 3: FIG. 7C

By relatively approaching the inner roll 60 and the outer roll 70 to the shoulder portion 3 of the can 1, the shoulder portion 3 is sandwiched by the receiving part 62, 72. That is, the protruding portion 65 of the receiving portion 62 presses the straight portion 10 of the can 1 from the inside, and the receiving portion 72 of the outer roll 70 receives the straight portion 10 from the outside.

Although detailed description is omitted, the manufacturing apparatus 50 detects the marking printed on the outer surface of the can 1 with an optical sensor. Then, based on the detection result, the manufacturing apparatus 50 drives the mounting table 51 to rotate and position the can 1 so that the processing position of the embossed portion 20 becomes a position corresponding to the printed portion 6*b*.

Rotation Step: FIG. 7C

The inner roll 60 and the outer roll 70 are rotated in a state where the shoulder portion 3 is sandwiched by the receiving portions 62, 72 in the sandwiching step, and the mounting table 51 and the can 1 are integrally rotated.

At this time, the shoulder portion 3 is reliably supported by the receiving portion 72 of the outer roll 70. Therefore, the shoulder portion 3 of the can 1 is less prone to be abnormally deformed, damaged or the like even if it is thin.

When the inner roll 60 rotates by one rotation, the inner roll 60, the outer roll 70, and the mounting table 51 stop rotating. As a result, the embossed portion 20 corresponding to the circumferential surface of one rotation of the receiving portion 62 of the inner roll 60 is formed on the shoulder portion 3.

Roller Retracting Step: FIG. 7D

The inner roll 60 and the outer roll 70 are separated from the shoulder portion 3 in the radial direction. Thus, in the height direction of the can 1, the inner roll 60 and the outer roll 70 are retracted to a position where they do not interfere with the can 1.

Retracting Step: FIG. 7E

By moving the mounting table 51, the can 1 is relatively separated from the processing position. Thus, the can 1 is retracted from the processing position.

The inner roll 60 and the outer roll 70 move relative to the can 1 by moving toward the mouth portion 4 side in the height direction. As a result, the inner roll 60 moves from the mouth portion 4 to the outside of the can 1.

As described above, in the can manufacturing method according to the present embodiment, the shoulder portion 3 is formed into a three dimensional shape while the receiving portion 62 of the inner roll 60 receives the shoulder portion 3 from the inner side, so that damage to the shoulder portion 3 can be suppressed.

As described above, in the can 1 of the present embodiment, the embossed portion 20 can be provided in the shoulder portion 3 while suppressing defects and the like. Thus, the can 1 having a new and unconventional form may be provided.

Second Embodiment

Next, a second embodiment of the disclosure will be described.

In the following description and drawings, the same names, the same reference signs, or the same reference signs at the end (last two digits) are appropriately given to portions that perform the same functions as those according to the first embodiment described above, and redundant description is appropriately omitted.

Figure 8A:
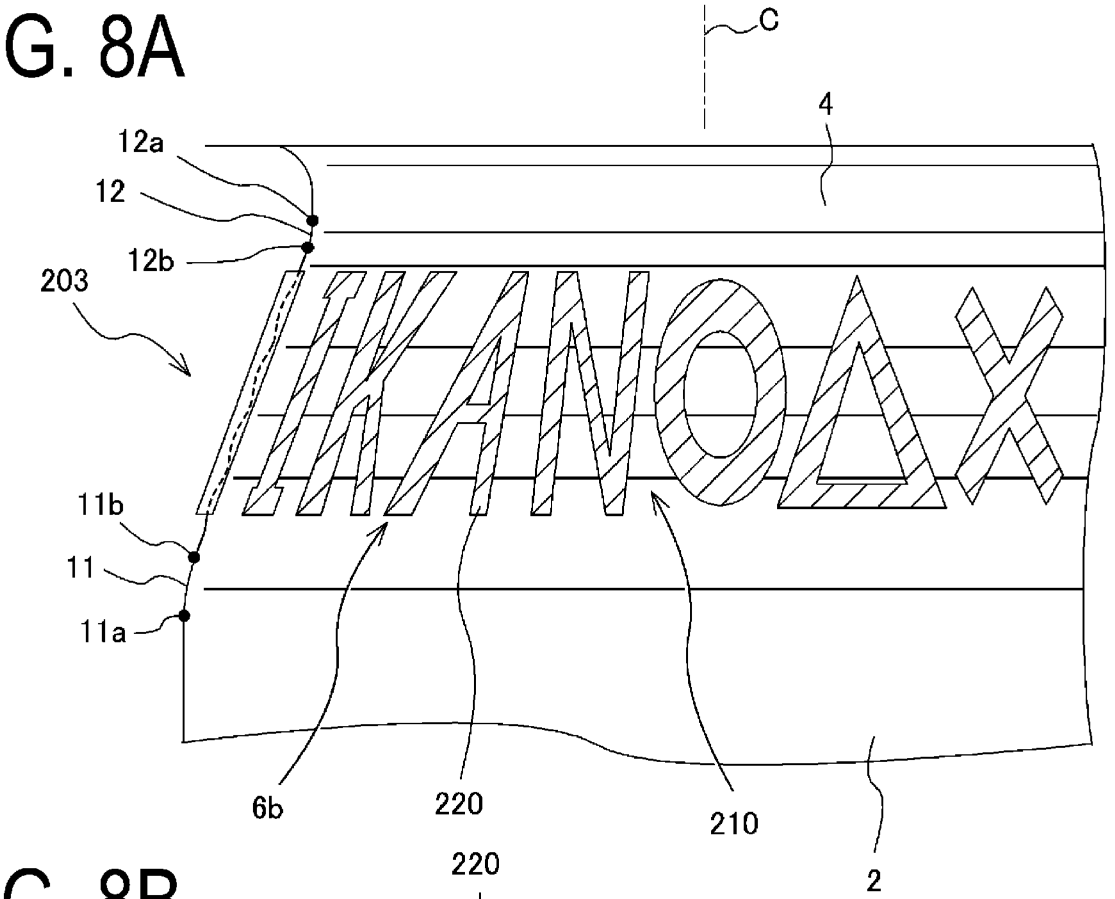
FIG. 8A and FIG. 8B are enlarged views of the vicinity of a shoulder portion 203 of a can 201 according to a second embodiment.
Figure 8B:
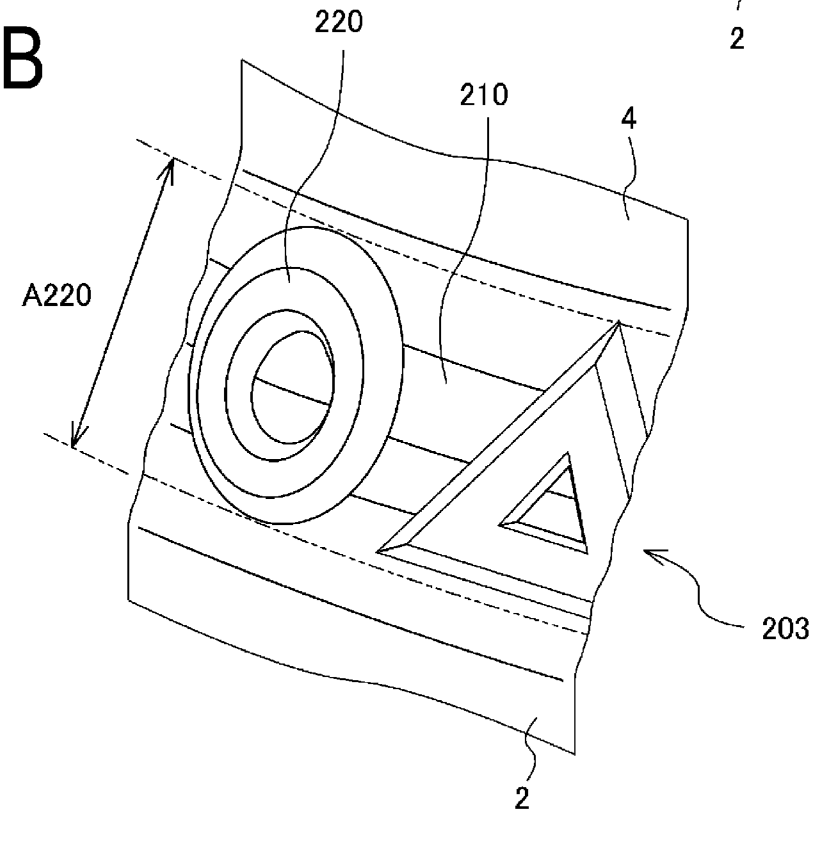

FIG. 8A and FIG. 8B are enlarged views of the vicinity of a shoulder portion 203 of a can 201 according to the second embodiment.

FIG. 8A is a view illustrating the vicinity of the shoulder portion 203 as viewed from the front (in a direction perpendicular to the can axis C).

FIG. 8B is a perspective view of the vicinity of the shoulder portion 203.

Figure 9:
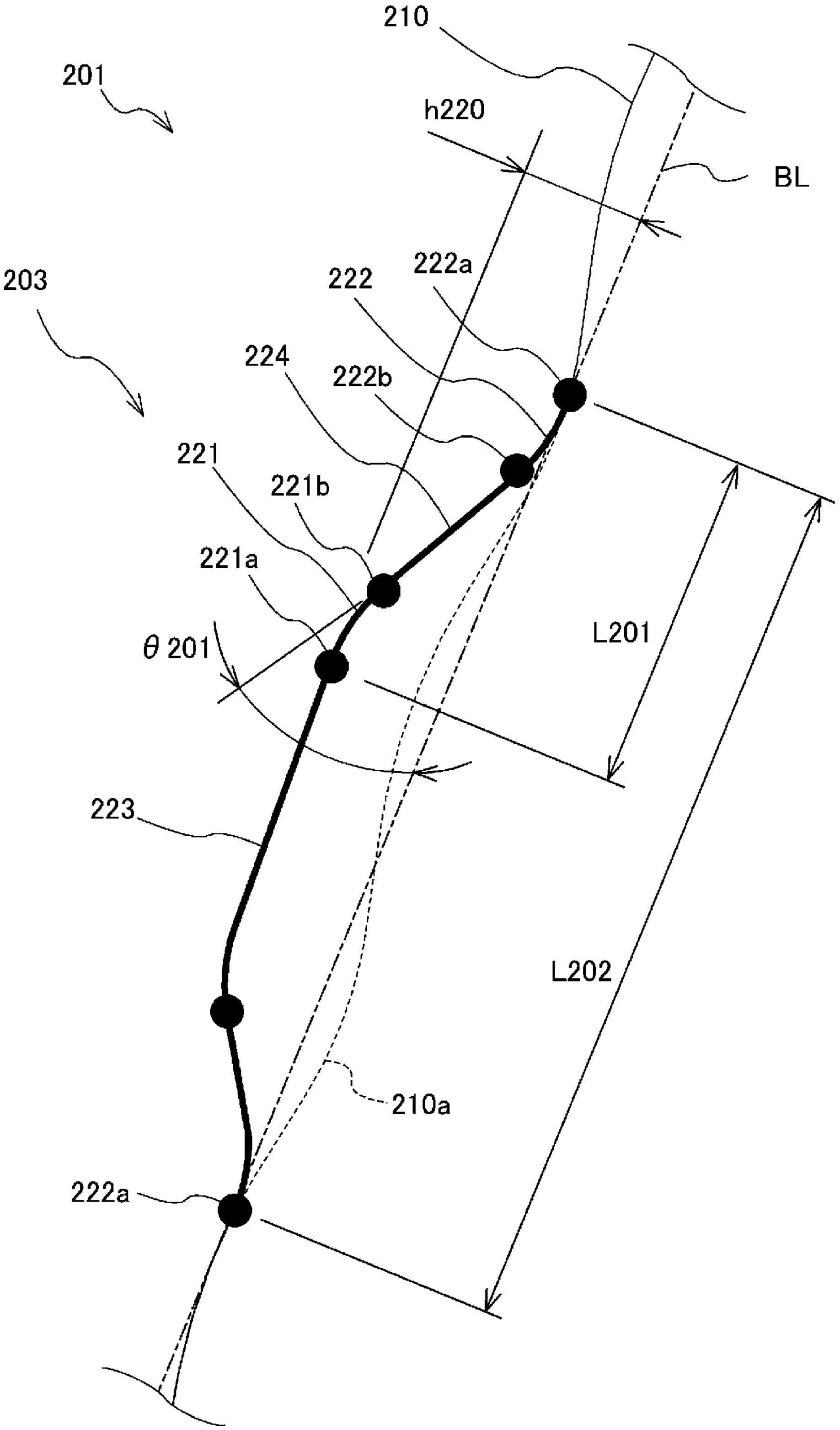
FIG. 9 is an enlarged vertical cross-sectional view of the vicinity of the shoulder portion 203 of the can 201 according to the second embodiment (a view taken along a cutting plane extending through a can axis C).

FIG. 9 is an enlarged vertical cross-sectional view of the vicinity of the shoulder portion 203 of the can 201 according to the second embodiment (a view taken along a cutting plane extending through a can axis C).

In FIG. 8A and FIG. 8B, and FIG. 9, the step height (height difference) or the like of a stepped portion 210 is illustrated in an exaggerated manner as appropriate.

FIG. 9 illustrates the surface (surface on the outer peripheral side) of the can 201, and an illustration of the thickness portion of the can 201 is omitted.

In FIG. 9, a thick line indicates the shape of an embossed portion 220, a thin line indicates the shape of the stepped portion 210, and a broken line 210*a* indicates the shape of the stepped portion 210 before embossing.

Although detailed description is omitted, the can 201 of the embodiment includes the front printed portion 6*b* (see FIG. 3A and FIG. 3B, and the like), the coating film 7 (see FIG. 2 and the like), and the like similar to those of the first embodiment.

As illustrated in FIG. 8A and FIG. 8B, and FIG. 9, in the can 201 of the present embodiment, the shoulder portion 203 is provided with the stepped portion 210 (inclined portion) with a series of uneven shapes. That is, the shape of the shoulder portion 203 in a vertical cross-sectional view (a view taken along a cutting plane extending through the can axis C) is a straight shape according to the first embodiment, whereas it is stepped with a series of uneven shapes in the present embodiment.

The stepped portion 210 may have a series of constant uneven shapes or a series of different uneven shapes. In the present embodiment, the former example will be described.

The stepped portion 210 has a shape in which the size in the radial direction (that is, the height of the step) varies depending on the position in the direction along the shoulder portion 203. Further, the cross-sectional shape of the step is constant or substantially constant in any cross section as long as the cross section is a longitudinal cross section (a cutting plane extending through the can axis C).

In addition, the shape of the can 201 is the same as that of the first embodiment except for the stepped portion 210, and the can 201 has the same function and effect as those of the first embodiment.

The shoulder portion 203, which is a reduced-diameter portion, is processed by a method similar to that for the reduced-diameter portion of a frame can with a multi-stage neck-in portion (for example, JP-A-8-224625). Since the step of the stepped portion 210 is formed at a joint portion of the shoulder portion 203 by this processing, the height (height difference) thereof is very small. Therefore, the stepped portion 210 has a shape that can be regarded as a substantially truncated cone side surface shape.

The shape of the embossed portion 220 of the present embodiment corresponding to that of the first embodiment can be defined as follows.

An alternate long and short dash line in FIG. 9 is a straight line connecting upper and lower contact points 222*a* of the root curved surface 222 and the stepped portion 210, and is a reference line BL for defining dimensions of each portion as described later.

Protruding amount h220: corresponds to the protruding amount h22 (see FIG. 4A and FIG. 4B). It is the maximum height of the embossed portion 220 from the reference line BL. In other words, it is the length of the longest line among perpendicular lines from the embossed portion 220 to the reference line BL.

Ridge curved surface 221, curvature radius R21: the ridge curved surface 221 corresponds to the ridge curved surface 21 (see FIG. 4A and FIG. 4B). The ridge curved surface 221 is a curved surface connecting a top surface 223 of the embossed portion 220 and a side surface 224 of the embossed portion 220. The curvature radius R21 corresponds to the curvature radius of the ridge curved surface 221.

Root curved surface 222, curvature radius R22: the root curved surface 222 corresponds to the root curved surface 22 (see FIG. 4A and FIG. 4B). The root curved surface 222 is a curved surface connecting the side surface 224 of the embossed portion 220 and the surface of the stepped portion 210. The curvature radius R22 corresponds to the curvature radius of the root curved surface 222.

Inclination angle θ201 (°): an inclination angle of the side surface 224 with respect to the reference line BL.

R center-to-center distance L201: a distance along the reference line BL between a contact point 221*a* and a contact point 222*a*. As in the first embodiment, the ridge curved surface 221 and the ridge curved surface 221 have a tangential line shape. Therefore, the R center-to-center distance L1 is a distance along the reference line BL between the center of the arc of the ridge curved surface 221 and the center of the arc of the root curved surface 222.

Outer shape L202 of embossed portion 220: an outer shape of the embossed portion 220, and the length between the upper and lower contact points 222*a*, that is, the length of a straight line connecting the upper and lower contact points 222*a*.

As described above, even if the stepped portion 210 does not have a strictly straight shape, the level difference is sufficiently small. Therefore, in a case where the protruding amount h220 of the embossed portion 220 is from 0.13 to 0.19 mm, the stepped portion 210 can be expected to have the same function and effect as those of the first embodiment with respect to suppression of cracking or the like of the printed portion 6*b* and the coating film 7 (see FIG. 1A and FIG. 1B, FIG. 2, and FIG. 3A and FIG. 3B) by setting the dimensions of the respective portions to the same dimensions as those of the first embodiment (see FIG. 4B).

In the above description and FIG. 9, the upper shape of the embossed portion 220 has been described, but the shape of each portion of the lower shape of the embossed portion 220 also needs to satisfy the above dimensional conditions. In addition, in a case where it is clear which of the upper shape and the lower shape of the embossed portion 220 causes the crack or the like of the printed portion 6*b* or the coating film 7 (for example, in a case where it is clear which of the upper shape and the lower shape is larger in the elongation of the raw material accompanying the embossing), only one of the dimensions may be managed.

As described above, in the can 201 of the present embodiment, even if the stepped portion 210 is formed in the shoulder portion 203, since the step difference is minute, it can be expected that the same operation and effect as those of the first embodiment can be obtained.

Third Embodiment

Next, a third embodiment of the disclosure will be described.

Figure 10:
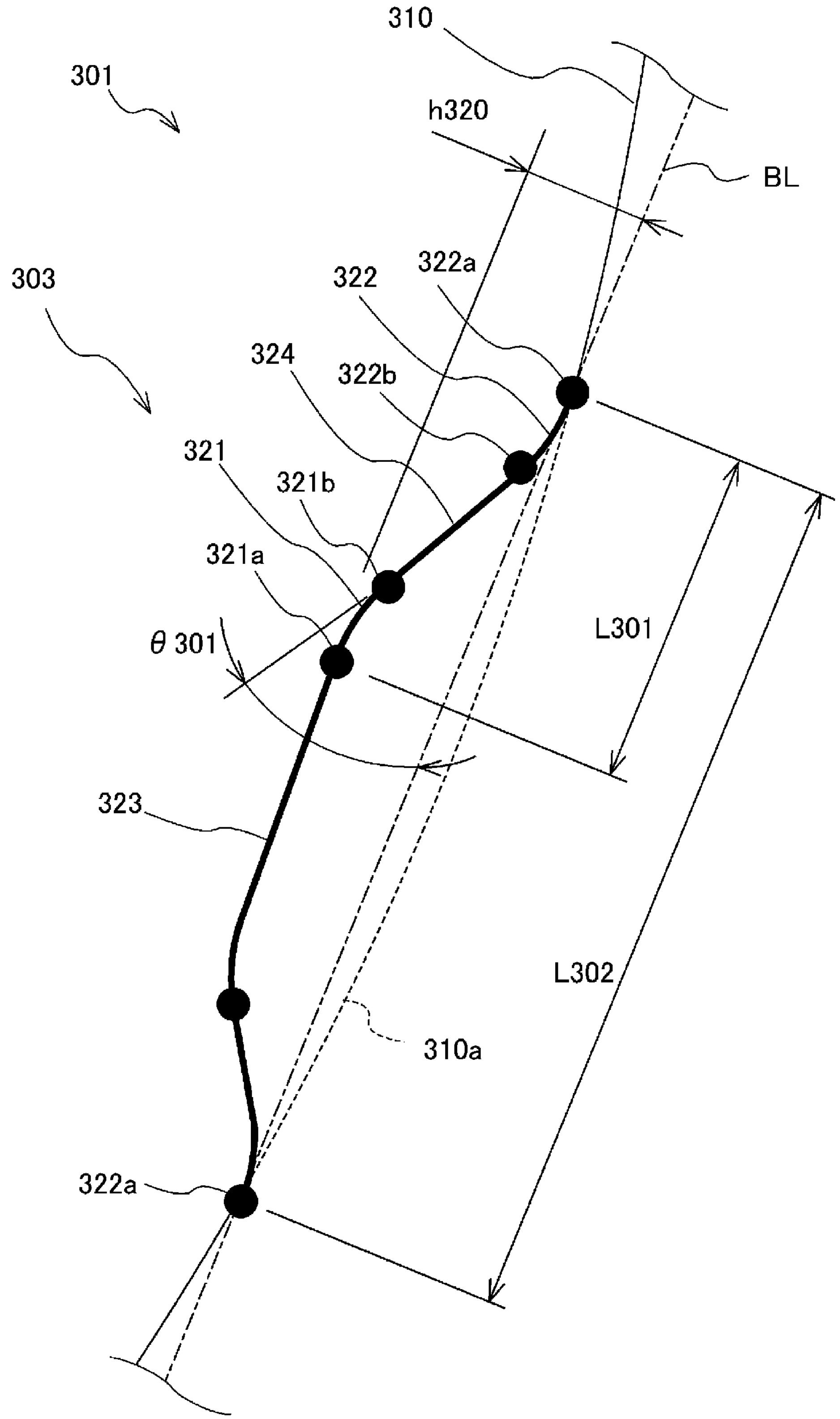
FIG. 10 is an enlarged vertical cross-sectional view of the vicinity of a shoulder portion 303 of a can 301 of a third embodiment (a view taken along a cutting plane extending through a can axis C).

FIG. 10 is an enlarged vertical cross-sectional view of the vicinity of a shoulder portion 303 of a can 301 according to the third embodiment (a view taken along a cutting plane extending through the can axis C).

As illustrated in FIG. 10, in the can 301 of the present embodiment, a curved portion 310 (inclined portion) is provided in the shoulder portion 303.

In FIG. 10, a thick line indicates the shape of an embossed portion 320, a thin line indicates the shape of the curved portion 310, and a broken line 310*a* indicates the shape of the curved portion 310 before embossing.

The curved portion 310 is gently curved to have a protruding shape toward the inside of the can. The curved portion 310 may be gently curved to have a protruding shape toward the outside of the can.

That is, in the second embodiment, the stepped portion 210 is formed at the shoulder portion, whereas in the present embodiment, the curved portion 310 is formed at the shoulder portion 303.

The reference line BL, a contact point 321*a*, a contact point 322*a*, a protruding amount h320, a ridge curved surface 321, the curvature radius R21, a root curved surface 322, the curvature radius R22, an inclination angle θ301, an R center-to-center distance L301, an outer shape L302 of the embossed portion 320, and the like can be defined in the same manner as in the second embodiment.

Also in the present embodiment, by making the curvature of the shape of the curved portion 310 sufficiently large, it can be expected that the same operation and effect as those of the first embodiment can be obtained.

Although the embodiments of the disclosure have been described above, the disclosure is not limited to the above-described embodiments. For example, various modifications and changes such as modifications to be described later are possible, and they are also within the technical scope of the disclosure. Further, the effects described in the embodiments are merely the most preferable effects generated from the disclosure, and the effects according to the disclosure are not limited to those described in the embodiments. It should be noted that the configurations of the above-described embodiment and modifications to be described later can be used in combination as appropriate, but detailed description thereof will be omitted.

Modifications (1) In the embodiment, an example in which the shape of the embossed portion is a shape of a character string or the like having a linear portion, a portion having a complicated shape (a curved portion, an intersecting portion, a portion forming a corner, or the like), or the like has been described, but the configuration is not limited thereto. At least some of the embossed portions may be in the form of small truncated cones, cones, or the like. In this case, one embossed portion is observed as one dot. Thus, the geometric shape of a character or the like can be expressed as a plurality of the dot patterns by the plurality of embossed portions.

Also in this case, the outer shape of the printed portion corresponding to each embossed portion and the outer shape of each embossed portion may be separated from each other by, for example, 1 mm or more. Furthermore, the printed portion (printed portion of characters or the like) corresponding to the dot pattern shape expressed by the plurality of embossed portions and the outer shape of the embossed portion may be separated from each other by, for example, 1 mm or more.

Also in this case, the embossed portion may be disposed in the installation range described in the embodiment, and may have the shape described in the embodiment. For example, by setting the curvature radius R21 of the ridge curved surface 21, the curvature radius R22 of the root curved surface 22, the R center-to-center distance L1, and the inclination angle θ1 of the embossed portion as described in the embodiment, the embossed portion can be expected to be visible, and exposure of the metallic base can be suppressed.

(2) In the embodiment, an example is illustrated in which the installation range of the embossed portion is an arc-shaped portion (see FIG. 1B) of the shoulder portion having a center angle θ of 0°<θ≤260°, but the configuration is not limited thereto. In the case of a continuous pattern in which the shape of the embossed portion regularly changes (for example, a pattern in which recessed and protruding shapes regularly continue such as in a so-called diamond cut), the installation range of the embossed portion may be a portion corresponding to an arc in which the center angle θ is 360° or less (0°<θ≤360°).

That is, in a case where the shape of the embossed portion changes regularly, the cross-sectional shape of the shoulder portion that is orthogonal to the can axis and includes the embossed portion has a shape in which the unevenness changes regularly. Thus, the inner roll and the outer roll can be provided with an uneven shape such that they continuously mesh with each other even when the inner roll rotates one turn or more. Thus, when the inner roll is rotated one turn or more at the time of embossing, the embossed portion can be formed in the arc-shaped portion having the center angle of 360° or less.

(3) The can may be a threaded can (such as a bottle can) in which a jaw portion, a thread portion, a curl portion, or the like is formed on the mouth portion of the can having a reduced diameter by providing a thread portion forming step after embossing. Further, the can may be a three-piece can in which the bottom portion, the trunk portion, and the lid portion are different members.

(4) In the embodiment, an example is illustrated in which the embossed portion is formed in the straight portion of the shoulder portion, but the configuration is not limited thereto. For example, in a can provided with a constriction having a straight portion in the vicinity of the center of the trunk portion or the like, the embossed portion may be provided in the constriction. Further, in a can provided with a chime portion having a straight portion, the embossed portion may be provided in the chime portion.

(5) In the embodiment, an example of the printed layer formed on the outer surface of the can surface of the can and the coating film formed on the inner surface of the can is illustrated, but the configuration is not limited thereto. At least one of the printed layer and the coating film may be provided on at least one of the outer surface and the inner surface of the can.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A can comprising:

a cylindrical portion;

a small-diameter portion having a diameter smaller than a diameter of the cylindrical portion; and a reduced-diameter portion that is provided between the cylindrical portion and the small-diameter portion, gradually decreases in diameter from a side of the cylindrical portion toward a side of the small-diameter portion, and has a film formed on at least one of an inner surface and an outer surface by printing or coating, wherein the reduced-diameter portion includes an inclined portion having an inclined cross-sectional shape extending through a center axis of the can;

a first curved portion that is a curved portion connecting the inclined portion and a can trunk portion;

a second curved portion that is a curved portion connecting the inclined portion and the small-diameter portion; and an embossed portion provided only in the inclined portion among the inclined portion, the first curved portion, and the second curved portion, wherein the embossed portion includes a top surface;

a side surface;

a ridge curved surface which is a curved surface forming a ridge line between the top surface and the side surface; and a root curved surface which is a curved surface connecting the side surface and an outer surface of the inclined portion, and wherein a protrusion height of the embossed portion, which is a length between an outer surface of the inclined portion and the top surface of the embossed portion in the normal direction of the inclined portion, is 0.3 mm or less.

2. The can according to claim 1, wherein the embossed portion is formed at a position away from an outer surface of a connecting portion between the first curved portion and the cylindrical portion by 0.8 mm or more in an inner radial direction, and is formed at a portion away from an outer surface of a connecting portion between the second curved portion and the small-diameter portion by 0.8 mm or more in an outer diameter direction.

3. The can according to claim 1, wherein a cross-sectional shape orthogonal to the center axis of the can and including the embossed portion of the reduced-diameter portion has an irregularly varying shape, and an installation range of the embossed portion in a circumferential direction in the reduced-diameter portion is a range corresponding to an arc having a center angle θ of 0°<θ≤260°.

4. The can according to claim 1, wherein a cross-sectional shape orthogonal to the center axis of the can and including the embossed portion of the reduced-diameter portion has a regularly varying shape, and an installation range of the embossed portion in a circumferential direction in the reduced-diameter portion is a range corresponding to an arc having a center angle θ of 360° or less.

5. The can according to claim 1, wherein a maximum outer shape measurement of the embossed portion is greater than or equal to 1.1 mm.

6. The can according to claim 1, wherein the protrusion height of the embossed portion is from 0.10 to 0.30 mm, and an inclination angle of the side surface of the embossed portion with respect to the inclined portion is from 9.4° to 25.4°.

7. The can according to claim 6, wherein the ridge curved surface has a curvature radius of from 1.0 to 3.3 mm.

8. The can according to claim 6, wherein the root curved surface has a curvature radius of from 0.4 to 2.3 mm.

9. The can according to claim 6, wherein in a cross-sectional shape extending through a can axis, a length along the inclined portion between an arc center of the ridge curved surface and an arc center of the root curved surface connecting the side surface of the embossed portion and the inclined portion is from 1.0 to 1.9 mm.

10. The can according to claim 1, wherein a center of the installation range of the embossed portion and a front center of the can are aligned.

11. The can according to claim 1, wherein the reduced-diameter portion includes a printed portion having a pattern corresponding to a shape of the embossed portion, and an outer shape of the pattern is disposed surrounding an outer shape of the embossed portion, or is disposed inward from the outer shape of the embossed portion.

12. The can according to claim 1, wherein the inclined portion is a straight portion having a straight cross-sectional shape.

13. The can according to claim 1, wherein the inclined portion is a stepped portion having a shape in which unevenness is repeated in a cross-sectional shape.

14. The can according to claim 1, wherein the inclined portion is a curved portion having a cross-sectional shape curved inwardly or outwardly from the can.

* * * * *